Nov. 13, 1962 W. R. HOWARD 3,063,742
HYDRODYNAMIC COUPLING
Filed July 30, 1958 2 Sheets-Sheet 1

INVENTOR.
WAYNE R. HOWARD
BY
*Kenneth C. Witt*
ATTY.

Nov. 13, 1962  W. R. HOWARD  3,063,742
HYDRODYNAMIC COUPLING
Filed July 30, 1958  2 Sheets-Sheet 2

INVENTOR.
WAYNE R. HOWARD
BY
Kenneth C. Witt
ATTY.

3,063,742
HYDRODYNAMIC COUPLING
Wayne R. Howard, Jackson, Mich., assignor to Clark
Equipment Company, a corporation of Michigan
Filed July 30, 1958, Ser. No. 752,079
1 Claim. (Cl. 285—321)

This invention relates to hydrodynamic coupling devices and more particularly to such couplings comprising a vaned pump or impeller and a vaned turbine. Such a device commonly includes a vaned annular shell connected to a driving member of dished shape to define a fluid circulating chamber receiving the turbine, the driving member being connected to a source of power, such as an engine, for driving the pump or impeller. More specifically, the present invention relates to an improvement in means for connecting and securing the driving member to the impeller.

In the manufacture of hydrodynamic couplings, the vanes and shell of the impeller and turbine are conventionally formed of light-weight metal such as aluminum by a casting process. The impeller shell is usually connected to an annular dished shape driving member to provide a fluid chamber, the dished member being formed of a casting or stamping of a metal such as steel of relatively thin section, having the inherent strength required to transfer torque from an engine to the vaned shell of the pump. A problem exists in the securing of such driving member to the aluminum shell in an economical and expeditious manner in the manufacture of fluid couplings and other hydrodynamic devices as it is necessary to provide a mechanical connection between the dished driving member and impeller shell which is capable of preventing axial separation of the member and shell by the fluid, under high pressure in the fluid chamber defined by the shell and member, and consequent escape or leakage of fluid from the chamber, as well as being able to effectively withstand the considerable forces, engendered by the transmission of torque from the driving member to the impeller shell, tending to sever the connection of the member and shell, during operation of the coupling.

Various constructions have been employed heretofore for connecting such a driving member and impeller shell. In one well-known construction which is utilized for this purpose radially extending flanges are provided on the outer periphery of the driving member and the shell respectively having openings therethrough for receiving bolts to secure the driving member and impeller shell together. However, such a connection is relatively expensive because of the cost involved in drilling a large number of holes, inserting bolts through the holes and tightening nuts on such bolts uniformly around the periphery to provide the proper alignment between the parts, and then inserting wires through holes in the bolts or otherwise locking the nuts against accidentally coming off their respective bolts during operation.

With the foregoing in mind, it is a primary object of the present invention to provide an improved arrangement for connecting a driving member and a vaned shell of a hydrodynamic coupling element, such as an impeller.

It is a further object to provide a means for clamping together two housing elements forming a fluid chamber for a hydrodynamic coupling which is easy to assemble, has a minimum number of parts and is effective to prevent leakage of fluid under high pressure from the fluid chamber.

In carrying out my invention in one preferred form, I provide a connection for two such elements which includes a radially extending flange on each. In addition, one of the flanges has an additional axially extending portion overlying the other flange, and interengaging portions are provided to transmit torque from one member to the other. For clamping the two members together a resilient snap ring is provided, suitably formed so as to hold the two housing elements in sealing engagement.

For a clearer and more complete understanding of my invention, reference should be had to the accompanying drawing wherein.

Figure 1:
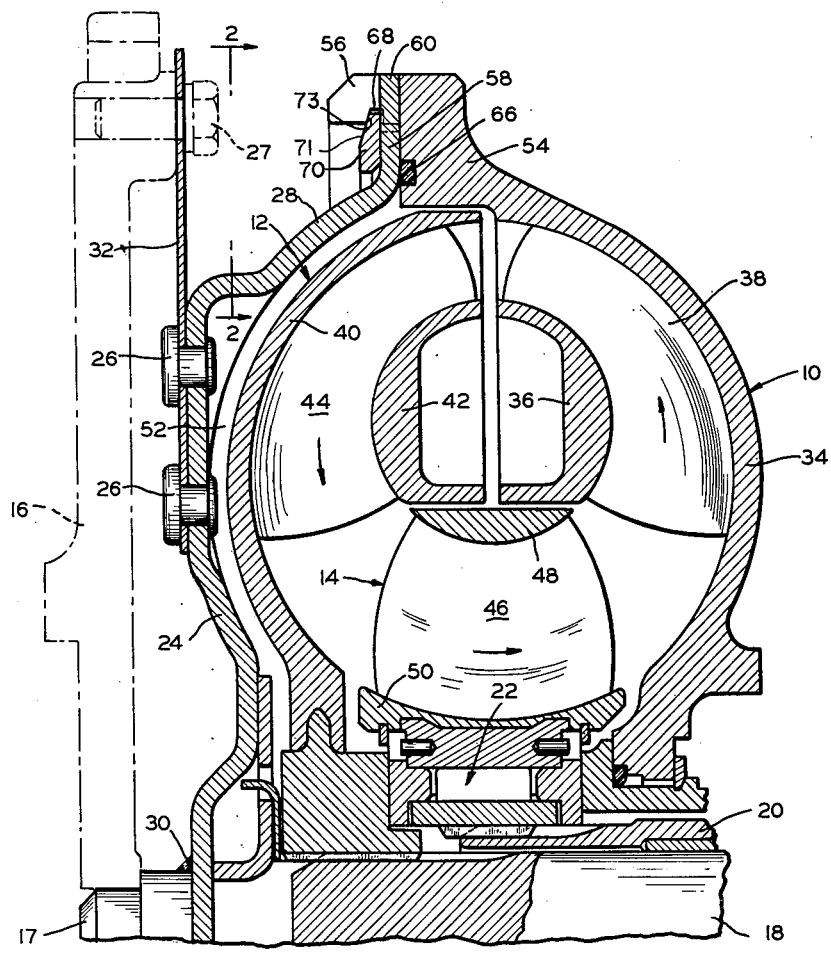
FIGURE 1 is a fragmentary cross-sectional view through the upper half of a hydrodynamic coupling illustrating the general arrangement of a preferred form of the present invention.

Referring to FIGURE 1, the hydrodynamic coupling device there shown is a fluid torque converted and comprises three vaned elements, namely an impeller 10, a turbine 12, and a reaction member 14. The impeller 10 is secured to a device such as a flywheel 16 (shown in phantom) coupled to a source of power, such as an engine, and the turbine 12 is connected to a driven shaft 18 for operating any desired mechanism. The reaction member 14 has an overrunning connection to a stationary reaction sleeve 20 through the medium of a one-way brake 22.

The impeller 10 is connected to flywheel 16 by a dished driving member 24. The member 24 is in the form of a disk having a peripheral portion 28 which follows the outer contour of the turbine 12, and is secured to a pilot portion 17 positioned in an opening in the flywheel by any suitable means, conveniently by welding such as shown at 30. Member 24 may be provided with a flat annular plate member 32 connected by rivets 26 to driving member 24 and at the plate's outer periphery to flywheel 16 in a suitable manner such as by screws 27. The impeller 10 may comprise a shell 34 of semi-toroidal shape and a core ring 36 of generally similar shape, and vanes 38 extending between and connected to the shell and core ring. The turbine 12 also comprises a semi-toroidal shell 40 and core ring 42 having vanes 44 extending between and secured to the shell and core ring. The reaction member 14 comprises vanes 46 extending between a core ring 48 and shell 50.

It will be understood that the shell and core ring of each vaned element described are both annular, although only portions of the shells and core rings are illustrated in the drawing and the vanes are curved and of varying thickness, such as those shown in U.S. Patents 2,306,758 and 2,410,185. The three vaned elements form and function as a hydrodynamic torque converter with the vanes of the impeller 10 functioning to impart energy to a body of fluid or liquid in the chamber 52, formed by the driving member 24 and shell 34 of the impeller, the turbine 12 receiving energy from the fluid and stator member 14 being held from rotation and functioning as a reaction element by the one way brake 22 to change the direction of the flow of fluid so that the device functions to multiply the torque until such time that the change in the direction of fluid leaving the turbine 12 and entering the stator 14 in the fluid circuit, indicated by the arrows, causes the stator shell 50 to be released by the one-way brake 22 to provide a substantially direct drive fluid connection between the drive shaft 16 and the driven shaft 18.

The shell, vanes, and core ring of each vaned element described are of aluminum and may be formed as an integral unit by methods such as die-casting, sand-casting, or plaster mold casting, which are conventionally employed to provide for the facile and economical manufacture of these vaned elements. The disk 24 of the impeller 10 is preferably formed of sheet steel for obtaining the advantages of lightness in weight and the required strength for the transmission of torque, the disk 24 being made to assume the shape shown in FIGURE 1 by a simple stamping operation.

It has been customary in the art to connect a steel driving member, such as 24, to an aluminum shell, such as 34, by mechanical connections, in view of the inability to weld steel to aluminum. Such mechanical connections have heretofore necessitated the provision of holes in radially extending flanges on the outer peripheries of the driving disk and the impeller shell for receiving bolts to connect the disk and shell together; or, the forming of threads on the outer peripheral edges of the driving disk and shell so that these members may be threadedly engaged; or the use of an annular threaded member to engage threads on the disk and shell, to securely hold the disk and shell together for torque transmission, or other such construction. These various ways of mechanically connecting the driving disk and a shell are inefficient and expensive operations in mass production manufacture, in view of the labor costs involved and the employment of expensive automatic drilling or thread-forming machines. The one-way brake for the stator member may become worn in use and require replacing which necessitates the disassembly of the torque converter including the driving dished member and the impeller shell, and the reassembly of these parts of the hydraulic torque converter; and if conventional mechanical connecting means are used considerable time is required for these operations in making repairs. Such repairs, of course, disable for an equal time the mechanism, such as a piece of construction machinery or an automobile, with which the converter is used.

The present invention is directed to the provision of a simple and inexpensive mechanical connection for uniting the driving member 24 and the vaned shell 34 of a hydrodynamic coupling vaned element. This mechanical connection considerably lessens the time required to assemble and disassemble the hydrodynamic coupling with attendant lower labor costs, and makes it possible to employ less expensive machinery and less time consuming methods in the manufacture of such a hydrodynamic coupling.

As previously described, the impeller 10 comprises the shell 34, vanes 38 and core ring 36 which are formed by any suitable method to provide an integral unit, being preferably cast as by die-casting, sand-casting, or by the use of plaster molds, or a combination of such processes. Assuming that the shell, vanes and core ring are cast by the use of a plaster mold or a plaster core portion for a mold, the mold is formed with the requisite and desired shapes to form these parts of the impeller 10 as shown in FIGURE 1. Molten aluminum is then poured into the mold and allowed to cool to solidify the same and thereby produce the cast aluminum structure comprising the impeller shell, core ring and vanes with the shell 34 having a radially extending flange 54 and an axially extending portion 56 on flange 54 at its radially outer peripheral edge as shown in FIGURES 1, 2 and 3.

Referring to the driving member 24, the outer peripheral edge thereof is also provided with radilly outwardly exending flange 58 shaped so as to fit in flat abutting relationship with the flange 54 of the impeller shell 34 when in assembled position.

Figure 2:
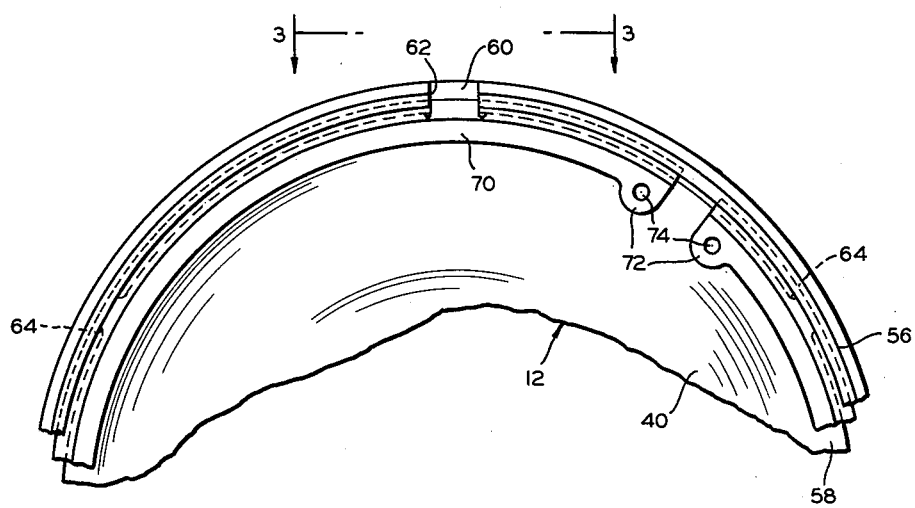
FIGURE 2 is a fragmentary end elevational view on a reduced scale taken substantially along the line 2—2 of FIGURE 1.
Figure 3:
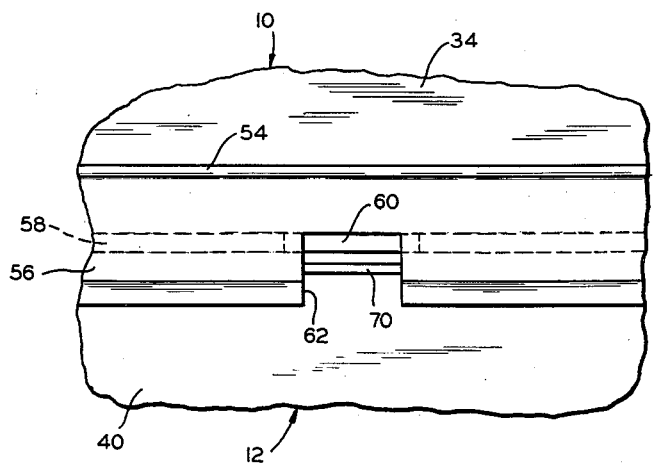
FIGURE 3 is a fragmentary plan view on an enlarged scale taken substantially along the line 3—3 of FIGURE 2.

As may be seen upon inspection of FIGURES 2 and 3, the flange 58 may be provided about its periphery with one or more radially outwardly extending driving lugs 60 which are adapted to be received within suitable recesses which as shown at 62 cut into the flange portion 56 on the impeller shell 34. The flange 58 may be further provided about its periphery with a plurality of centering lugs 64 to assist in axially aligning the members 24 and 10 during assembly. A gasket 66 of any suitable material, such as rubber, is positioned between the flanges 54 and 58 and is compressed thereby to prevent leakage of fluid, under pressure, from the fluid chamber 52.

As best seen in FIGURE 1 the axially extending flange portion 56 on the shell member 34 is provided on its inner surface with an annular groove 68 for the reception of a circular snap ring 70 having an inclined surface 71 which produces a substantially wedge shaped cross-section. The annular groove 68 is formed as shown so as to correspond to the cross-section of the snap ring 70, having a mating inclined surface 73 adapted to abut surface 71. The snap ring 70 is formed of any suitable metal, such as spring steel, having resiliency to forcibly urge the flanges 54 and 58 towards each other to thus effectively clamp the member 24 and the shell 34 together to prevent axial separation of the same by the working fluid under pressure in the torque converter and to maintain the driving lugs 60 on the flange 58 in torque transmitting engagement within the recesses 62 on the flange 56. The snap ring 70 is also effective to compress the annular gasket 66 between the flanges 54 and 58 so that the gasket is effective to prevent leakage of the fluid in the fluid chamber 52 to the exterior of the torque converter during operation of the torque converter when high fluid pressures prevail in the chamber 52.

It will thus be apparent that the snap ring 70 is instrumental in maintaining the driving lugs 60 of the disk 24 and the recesses 62 of the flanges 56 on the shell 34 in engagement to effect the transmission of torque from the driving disk 24 to the shell 34, to prevent axial separation of the disk 24 and shell 34, and to compress the gasket 66 to prevent leakage of liquid from the chamber 52, during operation of the torque converter.

In the assembly of the disk 24 and shell 34, the disk and shell are so positioned in relation to each other that the flanges 54 and 58 are in confronting relationship with the gasket 66 therebetween and the driving lugs 60 positioned within the recesses 62, the axial alignment of the two members being effected by means of the centering lugs 64. The snap ring 70 is initially formed so as to have a diameter somewhat larger than the diameter at the base of the annular groove 68 in the flange 56, and is interrupted peripherally so as to provide a gap between the adjacent ends thereof. The ends of the snap ring 70 may be provided with lugs 72 having apertures 74 therein. The apertures 74 are provided to receive the cooperating ends of a plier type tool which may be used to compress and expand the snap ring 70 by closing or opening the gap between the ends thereof. The snap ring is positioned within the annular groove 68 by first compressing same and placing it inwardly of the groove against flange 58. The ends are then released, and because of the resilient character of the snap ring material, the snap ring 70 endeavors to assume its normal diameter thus expanding into the groove 68. The cooperating wedge-like action between the inclined surfaces of the snap ring 70 and the groove 68 urges the flanges 54 and 58 toward each other and compresses the gasket 66 disposed between the flanges.

It will be apparent that the snap ring 70 is thus effective to provide a ready and easy connection of the member 24 to the shell 34 during the manufacture of hydrodynamic couplings and in the event the one-way brake, or bearings, or other parts of the torque converter, should become worn in use, the worn parts may be readily replaced as it is necessary only to remove the snap ring 70 to disassemble the disk 24 and shell 34, thus providing an expeditious and simple operation to either effect assembly or disassembly of the driving disk 24 and the shell 34 of the impeller 10. The spring steel, or other resilient metal, forming the snap ring 70 inherently provides sufficient force to effectively prevent any possibility of separation of the driving disk 24 and shell 34 by the pressure of the fluid within the chamber defined by the same during operation of the hydrodynamic coupling. However, under the influence of centrifugal force, during operation of the hydrodynamic coupling, the snap ring 70 is urged outwardly thereby further increasing the wedging action thereof to maintain the flanges 54 and 58 in sealing engagement with the gasket 66.

While the present invention has been shown and described herein by way of reference to one particular embodiment, it will be apparent to those skilled in the art that modifications may be used, without departing from the spirit of the invention, and it is intended to cover by the appended claims all such modifications which fall within the true spirit and scope of this invention.

I claim:

In a coupling for cooperating annular driving and driven members, said driving and driven members having radially extending flanges in confronting relationship, one of said flanges having an integral axially extending portion overlying the other of said flanges, cooperating means on said axially extending flange portion and said other flange for drivingly connecting said members, a sealing member disposed between said radially extending flanges, an annular recess in the inner surface of said axially extending flange portion, said annular recess having an inclined surface sloping from said inner surface outwardly toward said other flange, and a resilient snap ring disposed in said recess having a mating inclined surface in abutting relation with said first-mentioned inclined surface and an opposite surface in abutment with the said other flange, whereby the resilience of said snap ring acts to forceably urge said radially extending flanges toward each other and under the influence of centrifugal force during operation of the coupling urges said radially extending flanges toward each other with greater force.

References Cited in the file of this patent

UNITED STATES PATENTS

| | | |
|---|---|---|
| 1,233,168 | Berry | July 10, 1917 |
| 2,595,787 | Heimann | May 6, 1952 |
| 2,688,856 | Heisler | Sept. 14, 1954 |
| 2,699,656 | Anderson et al. | Jan. 18, 1955 |
| 2,723,136 | Deubler | Nov. 8, 1955 |
| 2,748,715 | Mamo | June 5, 1956 |
| 2,784,675 | Farrell | Mar. 12, 1957 |

FOREIGN PATENTS

| | | |
|---|---|---|
| 2,691 | Great Britain | Oct. 26, 1861 |
| 336,589 | Great Britain | Oct. 15, 1930 |
| 498,108 | Canada | Dec. 7, 1953 |